US012586150B2

(12) United States Patent     (10) Patent No.:   US 12,586,150 B2
Emarose et al.               (45) Date of Patent:      Mar. 24, 2026

(54) EFFICIENT BI-DIRECTIONAL IMAGE SCALING

(71) Applicant: QUALCOMM Incorporated, San Diego, CA (US)

(72) Inventors: Sriram Emarose, Chennai (IN); Raja Shekhar Reddy Annam, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 18/471,255

(22) Filed: Sep. 20, 2023

(65) Prior Publication Data

US 2025/0095101 A1     Mar. 20, 2025

(51) Int. Cl.
*G06T 3/40*       (2024.01)
*G06T 1/20*       (2006.01)

(52) U.S. Cl.
CPC . *G06T 3/40* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 2001/0055339 A1* | 12/2001 | Choi | ..................... | H04N 19/59 |
| | | | | 375/E7.133 |
| 2024/0031540 A1* | 1/2024 | Wu | ........................... | G06T 3/40 |
| 2025/0080718 A1* | 3/2025 | Deng | .................. | H04N 19/105 |

* cited by examiner

*Primary Examiner* — Darryl V Dottin
(74) *Attorney, Agent, or Firm* — Seyfarth Shaw LLP

(57) ABSTRACT

A processor-implemented method for scaling an image includes receiving a digital image including at least a portion to be scaled. A set of pixels of the portion to be scaled in a horizontal direction is sampled. The sampled set of pixels is bi-directionally scaled by applying a horizontal scaling parameter to the sampled set of pixels to compute a horizontally scaled value. The horizontally scaled value is accumulated until a counter is equal to a vertical scaling parameter. A bi-directionally scaled value is computed by applying the vertical scaling parameter to the accumulated horizontally scaled value. The bi-directionally scaled value is stored.

26 Claims, 10 Drawing Sheets

100

650

800

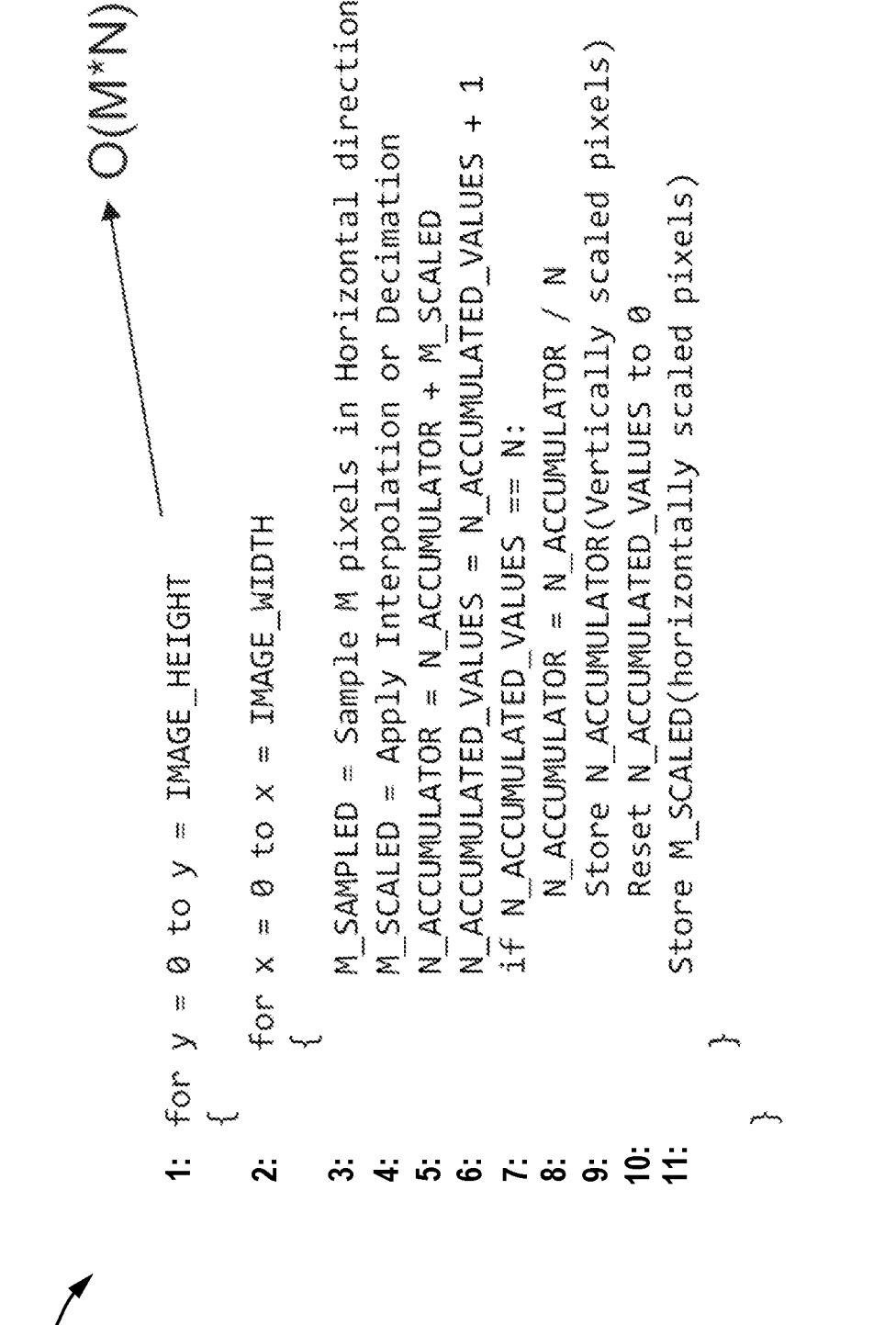

```
O(M*N)

1:  for y = 0 to y = IMAGE_HEIGHT
    {
2:      for x = 0 to x = IMAGE_WIDTH
        {
3:          M_SAMPLED = Sample M pixels in Horizontal direction
4:          M_SCALED = Apply Interpolation or Decimation
5:          N_ACCUMULATOR = N_ACCUMULATOR + M_SCALED
6:          N_ACCUMULATED_VALUES = N_ACCUMULATED_VALUES + 1
7:          if N_ACCUMULATED_VALUES == N:
8:              N_ACCUMULATOR = N_ACCUMULATOR / N
9:              Store N_ACCUMULATOR(Vertically scaled pixels)
10:             Reset N_ACCUMULATED_VALUES to 0
11:         Store M_SCALED(horizontally scaled pixels)
        }
    }
```

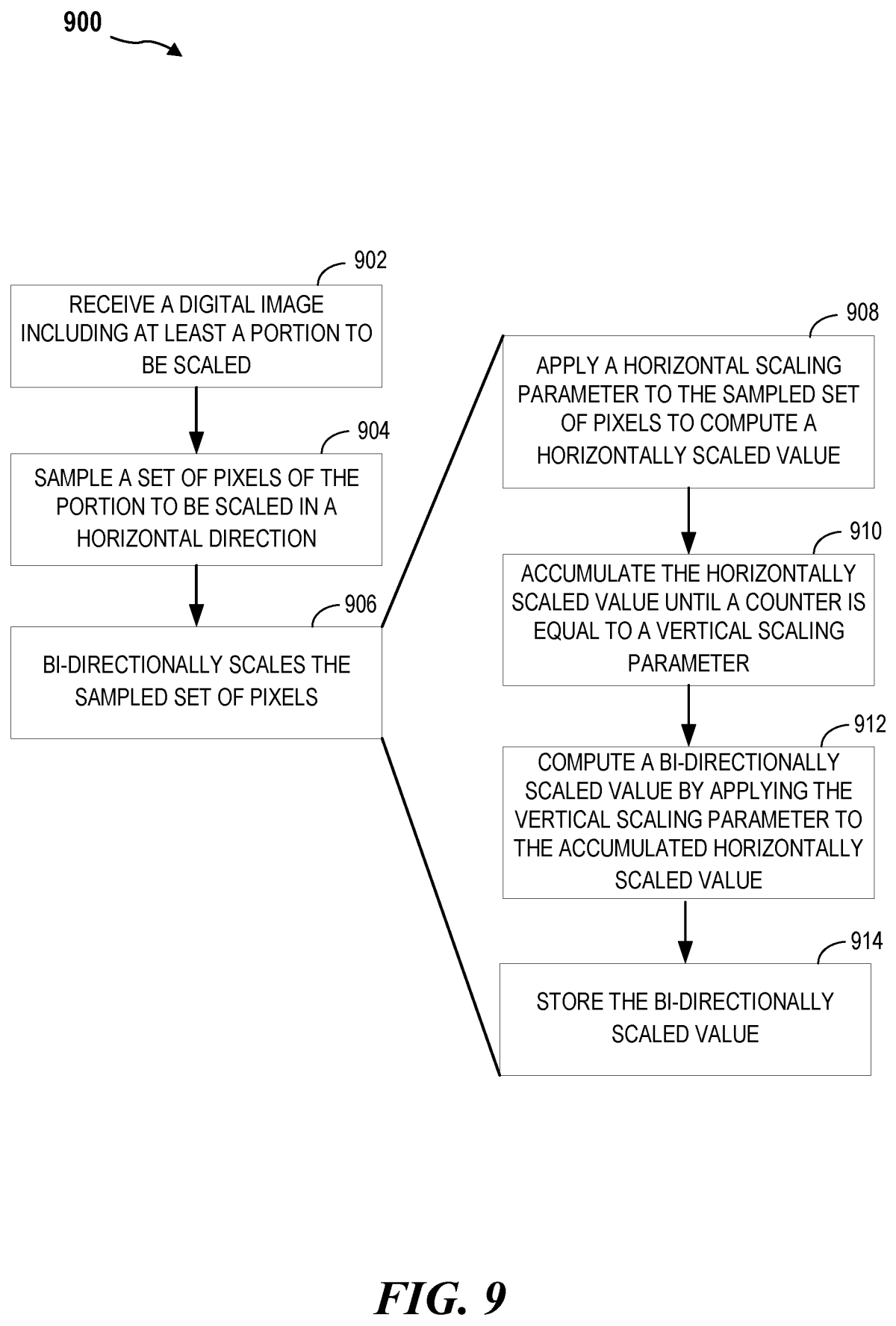

RECEIVE A DIGITAL IMAGE
INCLUDING AT LEAST A PORTION TO
BE SCALED
902

SAMPLE A SET OF PIXELS OF THE
PORTION TO BE SCALED IN A
HORIZONTAL DIRECTION
904

BI-DIRECTIONALLY SCALES THE
SAMPLED SET OF PIXELS
906

APPLY A HORIZONTAL SCALING
PARAMETER TO THE SAMPLED SET
OF PIXELS TO COMPUTE A
HORIZONTALLY SCALED VALUE
908

ACCUMULATE THE HORIZONTALLY
SCALED VALUE UNTIL A COUNTER IS
EQUAL TO A VERTICAL SCALING
PARAMETER
910

COMPUTE A BI-DIRECTIONALLY
SCALED VALUE BY APPLYING THE
VERTICAL SCALING PARAMETER TO
THE ACCUMULATED HORIZONTALLY
SCALED VALUE
912

STORE THE BI-DIRECTIONALLY
SCALED VALUE
914

*FIG. 9*

EFFICIENT BI-DIRECTIONAL IMAGE SCALING

TECHNICAL FIELD

Certain aspects of the present disclosure relate to image processing, and more particularly, to efficient bi-directional image scaling for hardware acceleration devices.

BACKGROUND

An artificial neural network, which may include an interconnected group of artificial neurons, may be a computational device or may represent a method to be performed by a computational device. Artificial neural networks may have a corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

In computing, hardware acceleration is the use of computer hardware to perform functions more efficiently than is possible in software running on a general-purpose central processing unit (CPU). The hardware that performs the acceleration may be referred to as a hardware-accelerator. Machine learning (ML)-accelerators may improve the performance of artificial neural networks.

Image processing techniques, such as image scaling, are frequently employed in artificial neural networks for inference tasks and other applications. Image scaling techniques, such as bi-directional (M-N) scaling, may be applied to digital images to upscale or downscale the digital image when the horizontal (M) and vertical (N) scaling ratio is non-uniform. Conventional techniques may perform bi-directional image scaling in a three-step process in which the image is transposed multiple times to perform the scaling operations.

However, when bi-directional scaling is implemented in a hardware accelerator, the digital image is loaded in a vectorized format. As such, loading the digital image and conducting the scaling operations are challenging.

SUMMARY

In some aspects of the present disclosure, a processor-implemented method includes receiving a digital image including at least a portion to be scaled. The processor-implemented method also includes sampling a set of pixels of the portion to be scaled in a horizontal direction. The processor-implemented method further includes bi-directionally scaling the sampled set of pixels by applying a horizontal scaling parameter to the sampled set of pixels to compute a horizontally scaled value. The horizontally scaled value is accumulated until a counter is equal to a vertical scaling parameter. A bi-directionally scaled value is computed by applying the vertical scaling parameter to the accumulated horizontally scaled value. The bi-directionally scaled value is stored.

Various aspects of the present disclosure are directed to an apparatus including means for receiving a digital image including at least a portion to be scaled. The apparatus also includes means for sampling a set of pixels of the portion to be scaled in a horizontal direction. The apparatus further includes means for bi-directionally scaling the sampled set of pixels by applying a horizontal scaling parameter to the sampled set of pixels to compute a horizontally scaled value. The horizontally scaled value is accumulated until a counter is equal to a vertical scaling parameter. A bi-directionally scaled value is computed by applying the vertical scaling parameter to the accumulated horizontally scaled value. The bi-directionally scaled value is stored.

In various aspects of the present disclosure, a non-transitory computer-readable medium with non-transitory program code recorded thereon is disclosed. The program code is executed by one or more processors and includes program code to receive a digital image including at least a portion to be scaled. The program code also includes program code to sample a set of pixels of the portion to be scaled in a horizontal direction. The program code further includes program code to bi-directionally scale the sampled set of pixels by applying a horizontal scaling parameter to the sampled set of pixels to compute a horizontally scaled value. The horizontally scaled value is accumulated until a counter is equal to a vertical scaling parameter. A bi-directionally scaled value is computed by applying the vertical scaling parameter to the accumulated horizontally scaled value. The bi-directionally scaled value is stored.

Another aspect of the present disclosure is directed to an apparatus having at least one memory and one or more processors coupled to the at least one memory. The processor(s) is configured to receive a digital image including at least a portion to be scaled. The processor(s) is also configured to sample a set of pixels of the portion to be scaled in a horizontal direction. The processor(s) is further configured to bi-directionally scale the sampled set of pixels by applying a horizontal scaling parameter to the sampled set of pixels to compute a horizontally scaled value. The horizontally scaled value is accumulated until a counter is equal to a vertical scaling parameter. A bi-directionally scaled value is computed by applying the vertical scaling parameter to the accumulated horizontally scaled value. The bi-directionally scaled value is stored.

This has outlined, broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for conducting the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 8 is a diagram illustrating example pseudocode for bi-directional image scaling, in accordance with various aspects of the present disclosure.

FIG. 9 is a flow diagram illustrating a method for bi-directional image scaling, according to various aspects of the present disclosure.

DETAILED DESCRIPTION

Figure 1:
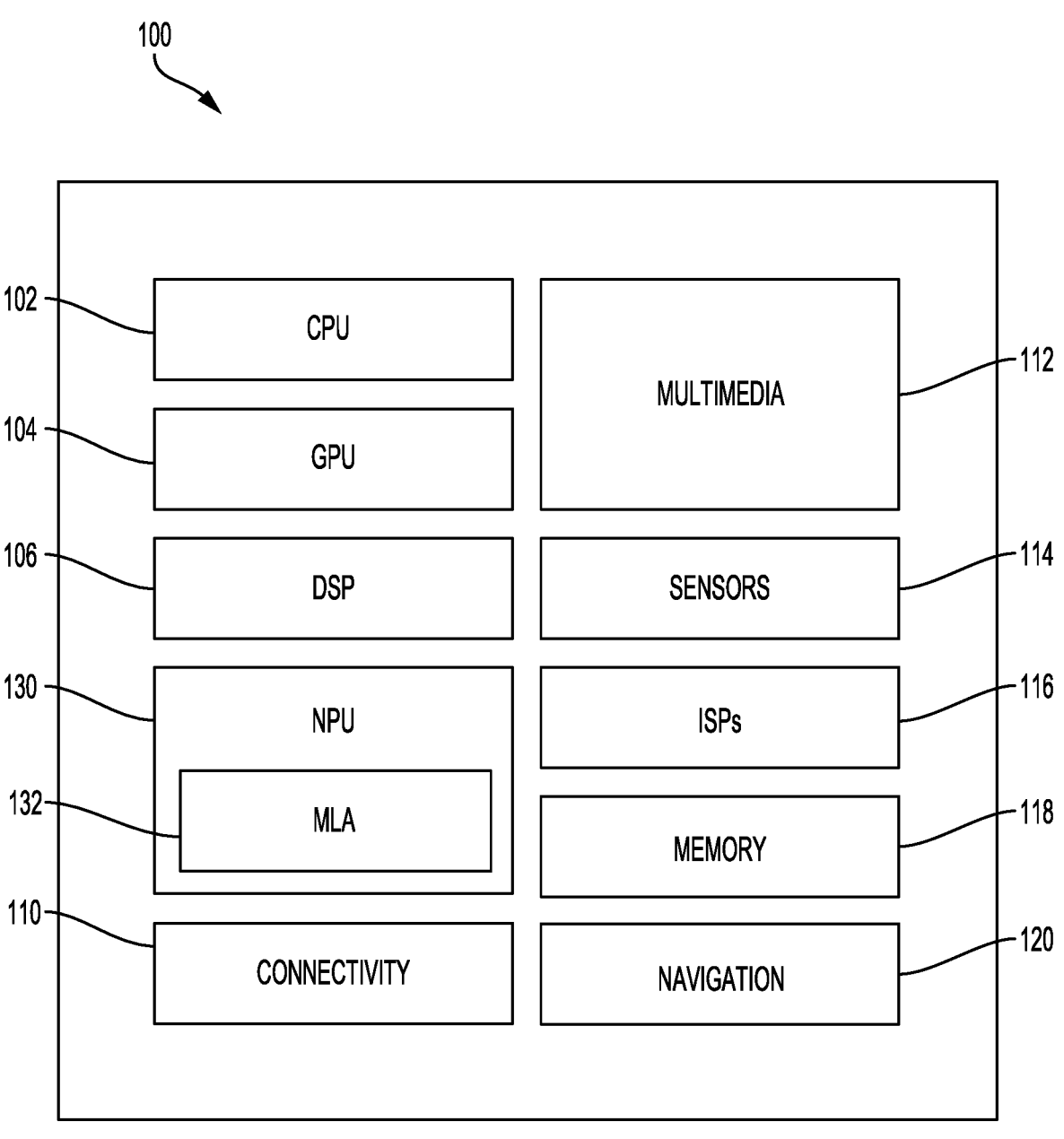
FIG. 1 illustrates an example implementation of designing an artificial intelligence inference accelerator (AIIA) for a neural network using a system-on-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. Any aspect of the disclosure disclosed may be embodied by one or more elements of a claim.

Although aspects are described, many variations and permutations of these aspects fall within the scope of the disclosure. Although some benefits and advantages of the preferred aspects are mentioned, the scope of the disclosure is not intended to be limited to benefits, uses, or objectives. Rather, aspects of the disclosure are intended to be universally applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

As described, a bi-directional (M-N) scaler may upscale or downscale an image when the horizontal (M) and vertical (N) scaling ratio is non-uniform. Bi-directional scaling involves a two-step approach where the image may first be scaled in the horizontal direction for the given 'M' value. Then, in the second step, the image may be scaled in the vertical direction for the given 'N' value. The order of the steps may also be reversed, such that scaling in the vertical direction precedes scaling in the horizontal direction.

Additionally, conventional approaches may transpose the image first to convert the vertical pixels into horizontal pixels and then the horizontal scaling operation may be performed. Thereafter, the image may be transposed a second time to place the vertically scaled pixels. However, the conventional approach makes the vertical scaling inefficient because multiple load and store operations are performed. For example, in the conventional approaches there may be three load cycles of the entire image as well as three store cycles of the entire image. That is, M pixels of an M×N image may be loaded in a horizontal direction. An interpolation or decimation process to respectively perform an upscaling or downscaling operation. The horizontally scaled pixels may be stored. Then, the image may be loaded and transposed from the M×N image format to an N×M image format and stored. Thereafter, N pixels may be loaded in the horizontal direction. The upscaling or downscaling operation may be performed and resulting scaled pixels in the vertical direction may be stored.

Aspects of present disclosure are directed to bi-directional image scaling. In various aspects of the present disclosure, rows of the digital image may be accumulated concurrently with performing the horizontal scaling. The accumulated rows may be scaled vertically and stored vertically.

FIG. 1 illustrates an example implementation of a system on chip (SoC) 100, which may include a central processing unit (CPU) 102 or multi-core CPUs, in accordance with certain aspects of the present disclosure, such an artificial intelligence (AI) inference accelerator (AIIA). Variables (e.g., neural signals and synaptic weights), system parameters associated with a computational device (e.g., neural network with weights), delays, frequency bin information, and task information may be stored in a memory block associated with a neural processing unit (NPU) 130, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

Figure 3:
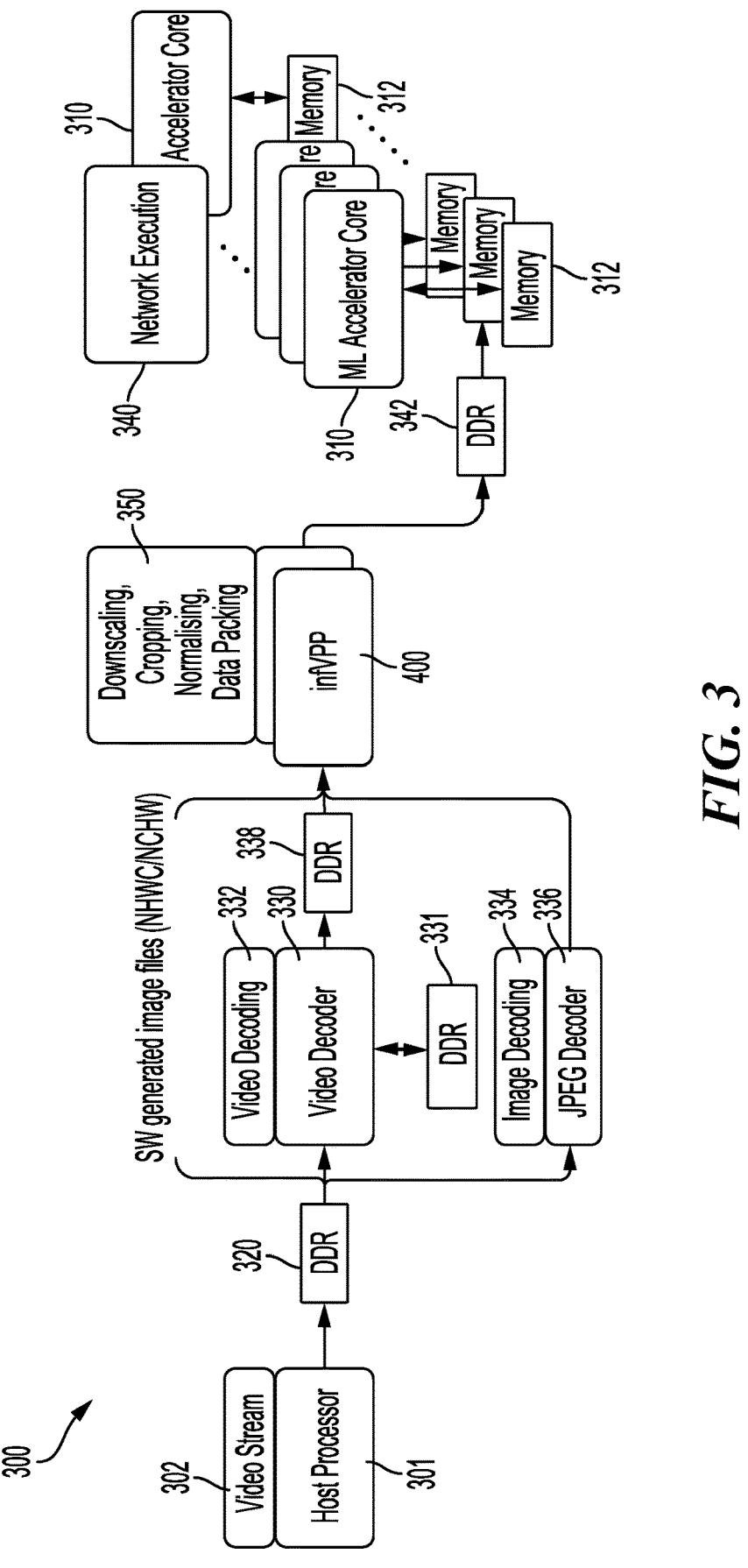
FIG. 3 is a block diagram illustrating a video inference processing flow of the ML-accelerator SoC of FIG. 2, according to various aspects of the present disclosure.

Aspects of the present disclosure are directed to a machine learning (ML) storage acceleration format for machine learning-accelerators (MLA) 132 of the NPU 130, which may be referred to as a packed dense depth data dump (D4) format. This packed D4 format allows for less wasted space for processing first layers of computer vision neural networks. The packed D4 format can be processed directly by the MLA 132 without having to convert to a standard layout. In some aspects of the present disclosure, the ML storage acceleration format of the MLA 132 supports up to four input channels by packing, for example, eight spatial patches (e.g., 8×8) into one memory storage block. Various aspects of the present disclosure are directed to supporting image/video processing using a machine learning (ML)-accelerator system-on-chip (SoC) architecture, for example, as shown in FIG. 3.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are like what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in diverse ways to recognize cars, trucks, and airplanes.

Neural networks may be designed with a variety of connectivity patterns. In feed-forward networks, information is passed from lower to higher layers, with each neuron in each layer communicating to neurons in higher layers. A hierarchical representation may be built up in successive layers of a feed-forward network, as described above. Neural networks may also have recurrent or feedback (also called top-down) connections. In a recurrent connection, the output from a neuron in each layer may be communicated to another neuron in the same layer. A recurrent architecture may be helpful in recognizing patterns that span more than one of the input data chunks that are delivered to the neural network in a sequence. A connection from a neuron in each layer to a neuron in a lower layer is called a feedback (or top-down) connection. A network with many feedback connections may be helpful when the recognition of a high-level concept may aid in discriminating the low-level features of an input.

Figure 2:
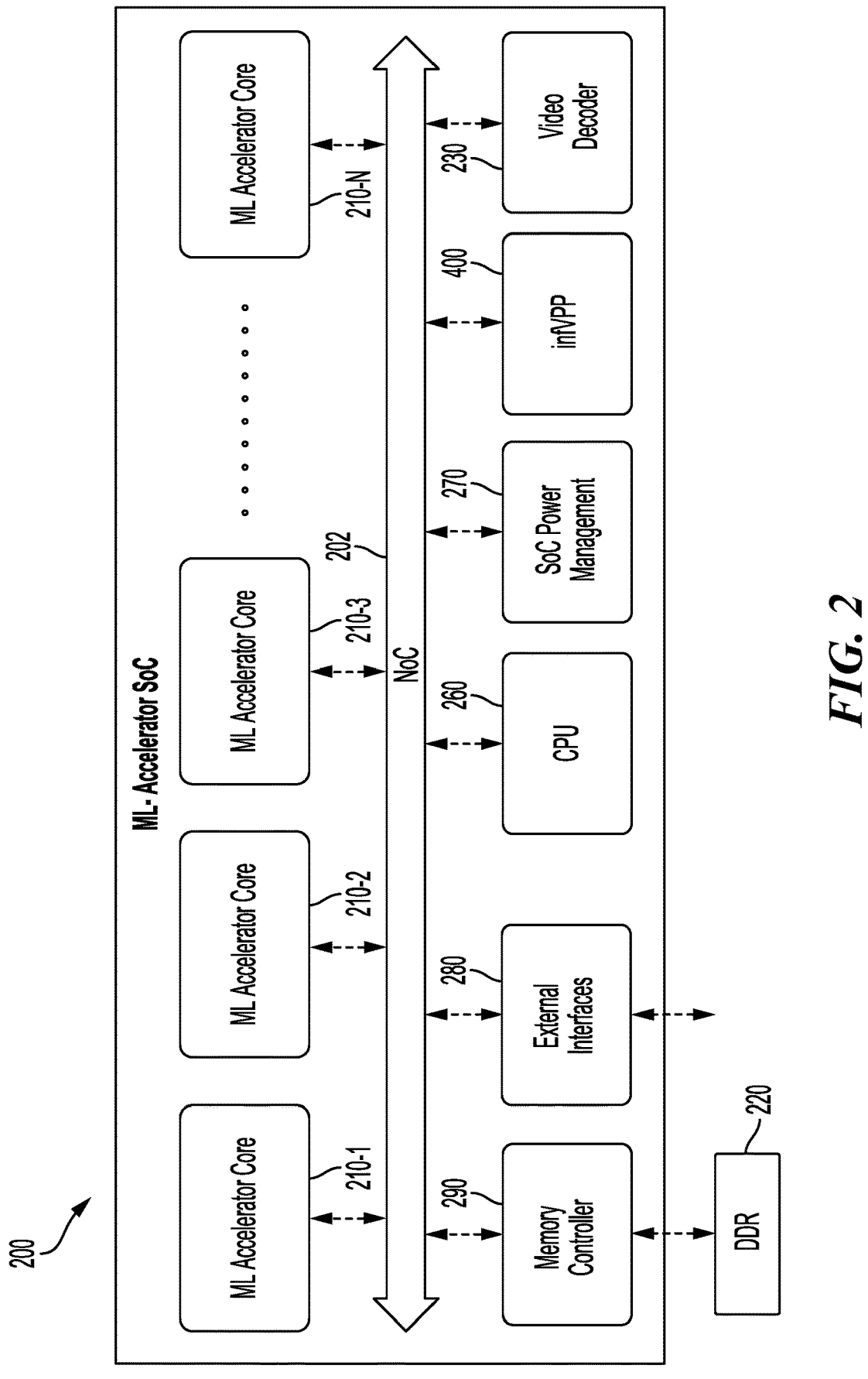
FIG. 2 is a block diagram illustrating a machine learning (ML)-accelerator system-on-chip (SoC) architecture, in accordance with various aspects of the present disclosure.
Figure 4:
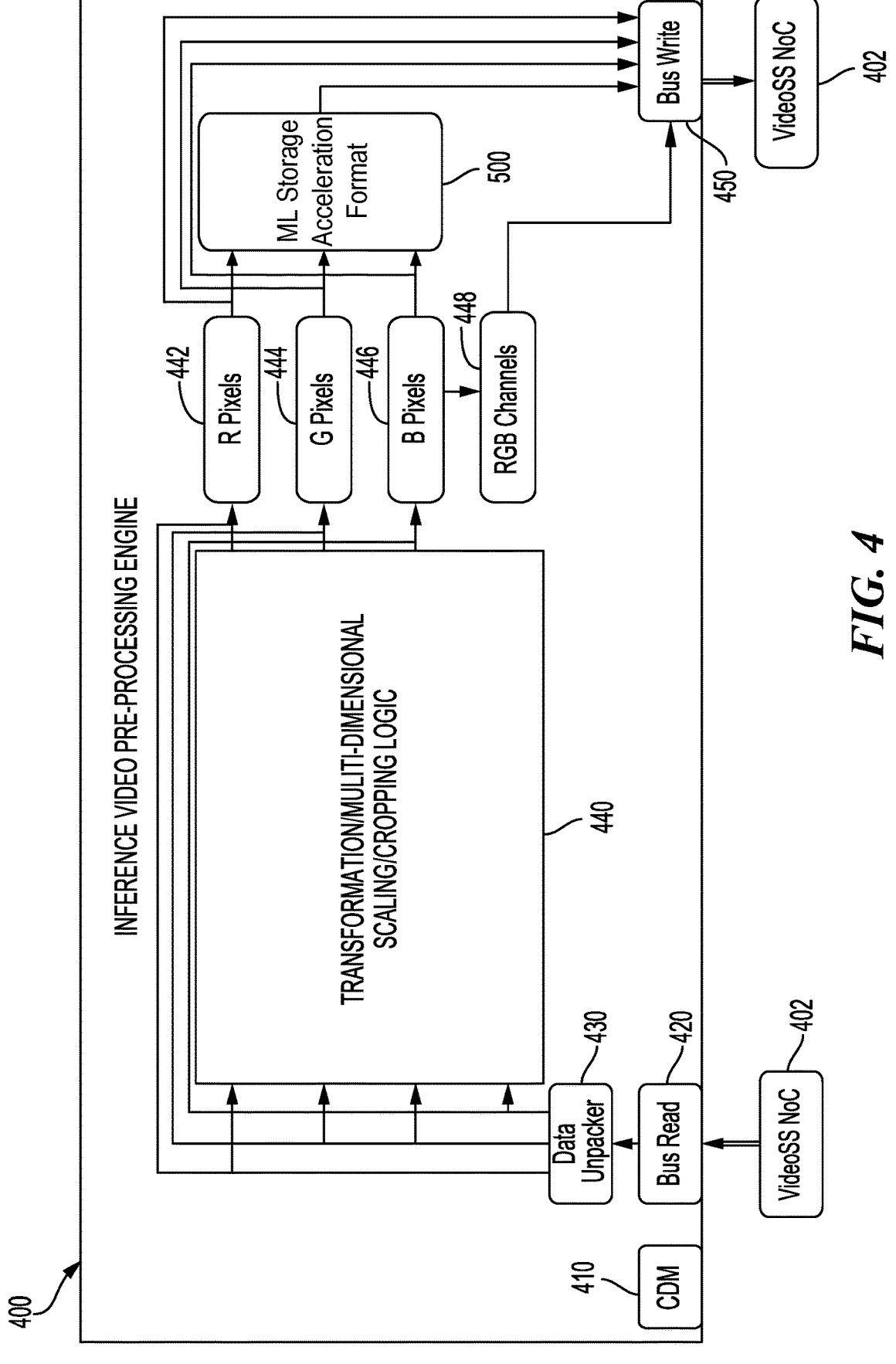
FIG. 4 is a block diagram further illustrating the inference video pre-processing (infVPP) module of FIGS. 2 and 3, in accordance with various aspects of the present disclosure.

FIG. 2 is a block diagram illustrating a machine learning (ML)-accelerator system-on-chip (SoC) architecture, in accordance with various aspects of the present disclosure. As shown in FIG. 2, an ML-accelerator SoC 200 includes a set of ML-accelerator cores 210 (210-1, 210-2, 210-3, . . . , 210-N) coupled together through a network-on-chip (NoC) 202. In some aspects of the present disclosure, the ML-accelerator SoC 200 includes an inference video post processing (infVPP) module 400 coupled to the NoC 202. The infVPP module 400, which is further illustrated in FIG. 4, is operatable to accelerate inference video processing of an image according to assigned addresses for image pixels of the image corresponding to a blocked ML storage acceleration format. Additionally, the ML-accelerator SoC 200 includes a video decoder 230 coupled to the NoC 202.

As shown in FIG. 2, the ML-accelerator SoC 200 includes a central processing unit (CPU) 260 and an SoC power management block 270 to control interoperation between the ML-accelerator cores 210, the video decoder 230, and the infVPP module 400. Additionally, the ML-accelerator SoC 200 includes external interfaces 280 as well as a memory controller 290 to access memory (e.g., double data rate (DDR) 220). This configuration of the ML-accelerator SoC 200 supports specified video/image processing, format conversion, data scaling, and data packing processes without incurring a drop in inference per second (inference/sec) performance, as further illustrated in FIG. 3.

FIG. 3 is a block diagram illustrating a video inference processing flow 300 of the ML-accelerator SoC 200 of FIG. 2, according to various aspects of the present disclosure. As shown in FIG. 3, the video inference processing flow 300 begins with the generation of a video stream 302 by a host processor 301, which is stored in DDR memory 320. In this example, the host processor 301 generates images filed in a predetermined format (e.g., an NCHW (batch_size (N), channel (C), height (H), weight (W)) format or an NHWC (batch_size (N), height (H), weight (W), channel (C)) format), which are subsequently stored in the DDR memory 320. Once stored, the image files are decoded by an image decoder 336 (e.g., a joint photographic experts group (JPEG) decoder) during an image decoding stage 334. Additionally, a video decoder 330 (e.g., video decoder 230 of FIG. 2) decodes images in a predetermined video format (e.g., luma (Y) blue projection (U) red projection (V) (YUV) format) during a video decoding stage 332 using DDR memory 331 for storing reference frames. The decoded video output from the video decoder 330 is stored in DDR memory 438.

In various aspects of the present disclosure, the infVPP module 400 provides an offline, memory-to-memory (e.g., DDR memory 338 (first memory) to DDR memory 342 (second memory)) processing engine controlled by a CPU, such as the CPU 260 of FIG. 2. For example, the infVPP module 400 provides downscaling, cropping, normalizing, and data packing operations 350 on decoded video/image data stored in the DDR memory 338, with the processed data stored as activation input data in the DDR memory 342 for the ML-accelerators (e.g., neural signal processors (NSPs) executing ML network models) of a network execution stage 340.

Integrating the infVPP module 400 in the ML-accelerator SoC 200 of FIG. 2 enables operation with the video decoder 330, which may be configured to support twenty-four (24) streams of video frames in predetermined resolution (e.g., 1080p or 4K resolution). The video decoder 330 may be further configured to process image data in a predetermined (e.g., YUV) format. In various aspects of the present disclosure, output video frame data is compressed using universal bandwidth compression (UBWC) and stored in the DDR memory 338. The decoded video/image data from the video decoder 330 may be processed by the infVPP module 400 to provide image processing, image data scaling, and formatting in the packed dense depth data dump (D4) format to provide activation input data for machine learning network models executing on NSPs, such as ML-accelerator cores 310. These machine learning network models are compatible with three-channel red, green, and blue (RGB) format, which is supported using data packed (organized) in D4 format by the infVPP module 400. Without integrating the infVPP module 400 in the ML-accelerator SoC 200, the video decoder 330 is forced to write the decoded frame data without the UBWC, resulting in a significant (e.g., 50%) drop in video decoding efficiency (e.g., 12×1080p 30 frames per second (FPS) or 4K ultra high definition (UHD) 30 FPS).

During the network execution stage 340, the ML-accelerator cores 310 (e.g., ML-accelerator cores 210 of FIG. 2) process the activation input data from the DDR memory 342 utilizing memory 312. In operation, ML network models executing on ML-accelerator cores 310 (e.g., NSPs) process images at lower resolution (e.g., 224×224, 512×512, 720× 720), including channel separated RGB images. Additionally, received image data is scaled (e.g., normalized, standardized, and quantized) and data is packed in the D4 format by the infVPP module 400 for efficient processing by the ML-accelerator cores 310. As shown in FIG. 3, the infVPP module 400 reads the video frames generated by the video decoder 330 and prepares the data for feeding to the ML network models executing on NSPs (e.g., the ML-accelerator cores 310). For video inferencing, the infVPP module 400 can efficiently execute video or image processing functions. In particular, the infVPP module 400 significantly improves (e.g., by more than 30%) an overall performance of the ML-accelerator cores 310, in terms of inferences performed per second (inference/sec).

FIG. 4 is a block diagram further illustrating the inference video pre-processing (infVPP) module 400 of FIGS. 2 and 3, configured to output data in a machine learning (ML) storage acceleration format, in accordance with various aspects of the present disclosure. The infVPP module 400 includes a data unpacker 430 to unpack video data from a bus read block 420 in response to a command 410. The bus read block 420 may read the video data from a video subsystem (VideoSS) network-on-chip (NoC) 402. In this configuration, the video data is provided to a transformation/ multi-dimensional scaling/cropping logic 440. The transformation/multi-dimensional scaling/cropping logic 440 may perform pre-processing/post-processing on a decoded image or video stream. The transformation/multi-dimensional scaling/cropping logic 440 outputs red (R) pixels 442, green (G) pixels 444, blue (B) pixels 446, and RGB channels 448.

The infVPP module 400 may process the first layer of a computer vision ML network. In practice, the first layer of many computer vision ML networks is limited to three channels (e.g., RGB). In practice, a tensor may represent the first layer of the computer vision ML network according to a standard NCHW format or an NHWC format, which is fully packed and does not waste any space. By contrast, layers of a computer vision ML network beyond the first layer usually have a greater number of channels (e.g., 32 or more channels). Unfortunately, ML hardware-accelerators expect a different data format. In these aspects of the present disclosure, the R pixels 442, G pixels 444, and B pixels 446 are processed by an ML storage acceleration format block 500, which outputs the pixel data in an ML storage acceleration format to a bus write block 450 to write the formatted data to the VideoSS NoC 402.

Figure 5:
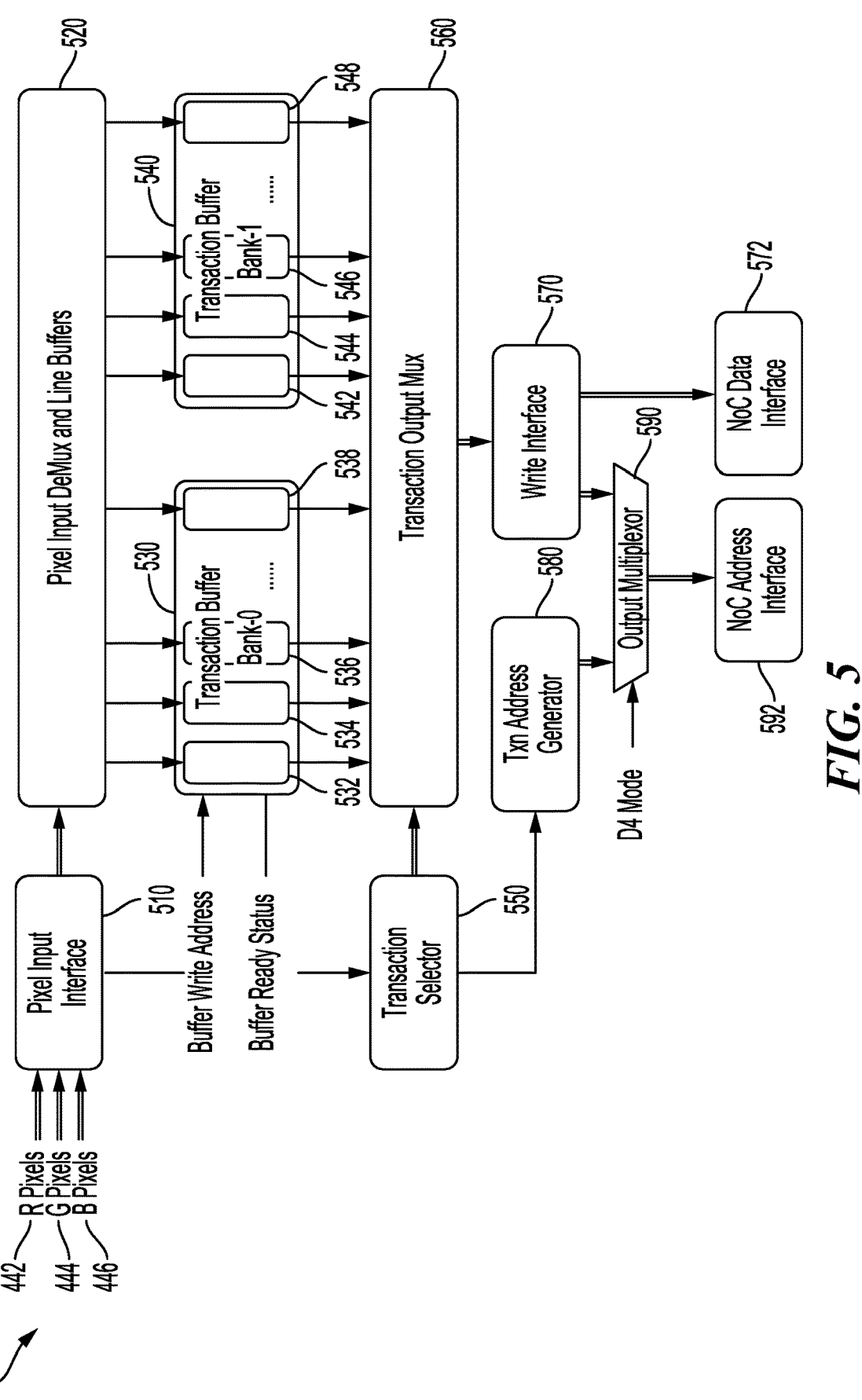
FIG. 5 is a block diagram further illustrating the machine learning (ML) storage acceleration format block of FIG. 4, in accordance with various aspects of the present disclosure.

FIG. 5 is a block diagram further illustrating the machine learning (ML) storage acceleration format block 500 of FIG. 4, in accordance with various aspects of the present disclosure. As shown in FIG. 5, the ML storage acceleration format block 500 includes a pixel input interface 510 to receive, for example, the R pixels 442, the G pixels 444, and the B pixels 446 from the transformation/multi-dimensional scaling/cropping logic 440 of FIG. 4. In operation, each RGB channel from the R pixels 442, the G pixels 444, and the B pixels 446 sends four pixels-per-clock (PPC). The ML storage acceleration format block 500 also includes pixel input de-multiplexer (DeMux) and line buffers 520 coupled to the pixel input interface 510. In this configuration, the pixel input DeMux and line buffers 520 de-multiplex two-by-two (2×2) RGB pixels, which are sorted and stored in transaction buffers 532, 534, 536, and 538 of a first transaction buffer bank 530 simultaneously. In a stride-2 mode, the first two lines are stored in the pixel input DeMux and line buffers 520. During the next two lines, the incoming pixels, and pixels from the pixel input DeMux and line buffers 520 are transferred to transaction buffers, such as transaction buffers 542, 544, 546, and 548 of a second transaction buffer bank 540.

In some aspects of the present disclosure, each of the transaction buffers (e.g., 532, 534, 536, 538, 542, 544, 546, and 648) are eight bits wide and can hold a full 256 byte transaction. During operation, a transaction selector 550 selects a transaction for writing from the transaction buffers (e.g., 532, 534, 536, 538, 542, 544, 546, and 548). For example, the transaction selector 550 selects the transaction based on the availability of transaction data in one of the transaction buffers (e.g., buffer full), when a transaction is selected for writing. In response to the transaction selector 550, a transaction output multiplexor (Mux) 560 forwards transaction data from the selected transaction buffer (e.g., 532, 534, 536, 538, 542, 544, 546, and 548) to a write interface 570. In addition, a transaction (Txn) address generator 580 generates the address for the write transaction, which is replaced by an output multiplexor 590 at an NoC address interface 592 and an NoC data interface 572 at an output of the write interface 570.

Some aspects of the first transaction buffer bank 530 and the second transaction buffer bank 540 operate in ping-pong mode. For example, while the first transaction buffer bank 530 is filled with incoming pixels, the second transaction buffer bank 540 is drained out to the write interface 570. Similarly, while the second transaction buffer bank 540 is drained out to the write interface 570, the first transaction buffer bank 530 is filled with incoming pixels. Each of the pixel input DeMux and line buffers 520 can hold 6096 pixels (e.g., full image line width) before filling the first transaction buffer bank 530 and/or the second transaction buffer bank 540. For a stride-2 mode, two lines each for the RGB channels (e.g., total of six lines) of the R pixels 442, the G pixels 444, and the B pixels 446 are stored in the pixel input DeMux and line buffers 520.

For a spatial major stride-2 mode, the first two lines are stored in the pixel input DeMux and line buffers 520. During the next two lines, the incoming pixels (e.g., the R pixels 442, the G pixels 444, and the B pixels 446) and pixels from the pixel input DeMux and line buffers 520 are stored in the transaction buffers (e.g., 532, 534, 536, 538, 542, 544, 546, and 548). This sequence of operations is repeated after every four lines. In these aspects of the present disclosure, the ML storage acceleration format block 500 converts the first layer of neural network data to an ML storage acceleration format. In some aspects of the present disclosure, the ML storage acceleration format is compatible with cases in which an initial layer is a stride-2 convolution using a decimate-by-four approach. In addition, the ML storage acceleration format is also compatible with cases in which the initial layer is using precision of either floating point sixteen (FP16) or quantized integer eight (INT8). The ML storage acceleration format may also support both spatial and channel major formats of matrix units.

Figure 6A:
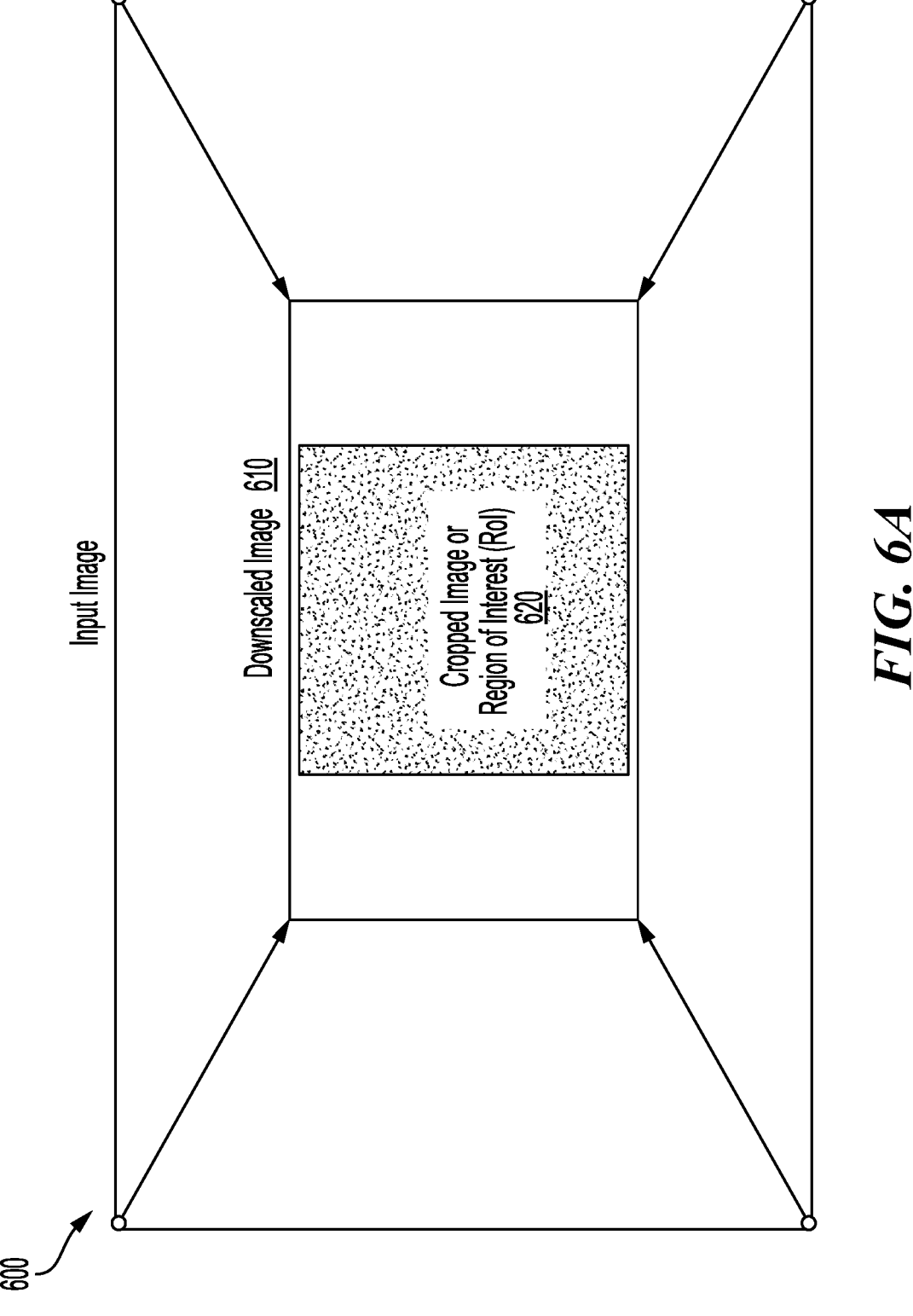
FIGS. 6A and 6B are block diagrams illustrating a flexible region of interest selection scheme, in accordance with various aspects of the present disclosure.
Figure 6B:
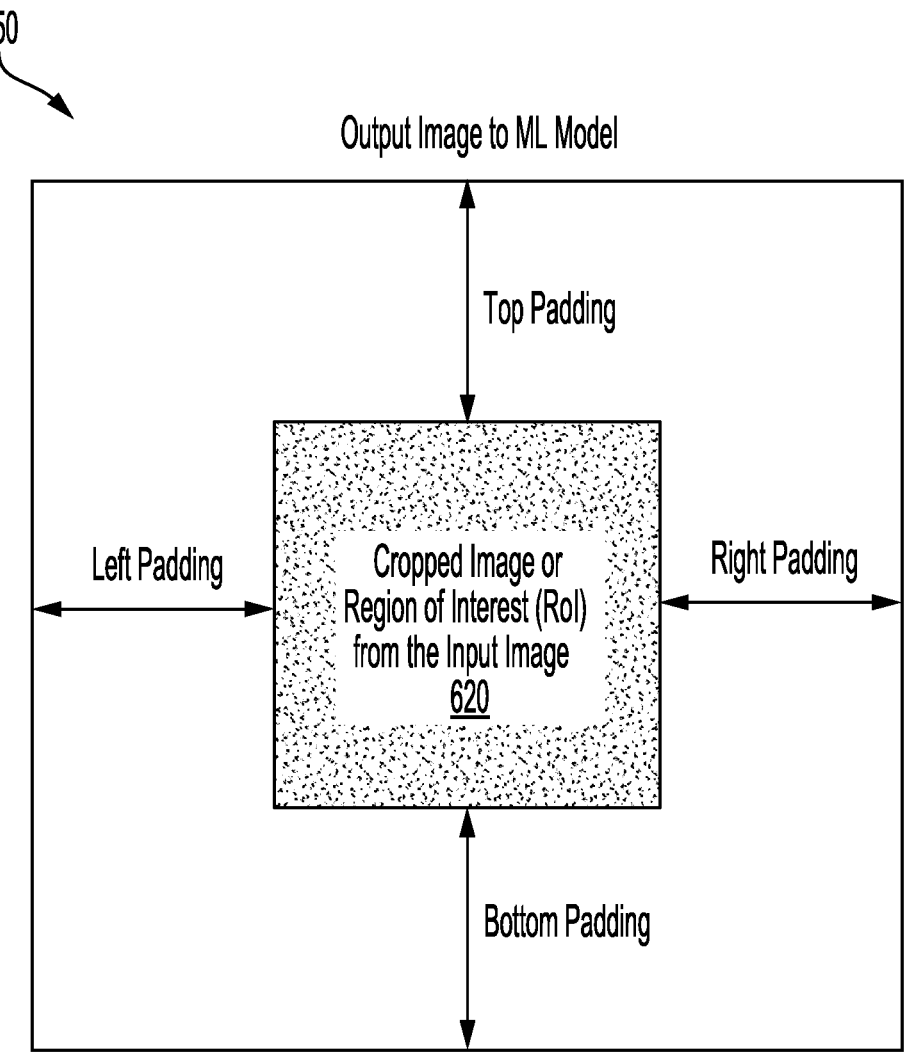

FIGS. 6A and 6B are block diagrams illustrating a flexible region of interest selection scheme, in accordance with various aspects of the present disclosure. Various aspects of the present disclosure provide an integrated hardware solution for image/video processing for on-chip ML accelerated inferencing. As shown in FIGS. 6A and 6B, this integrated hardware solution supports flexible region of interest (RoI) selection in an input image/video frame with a unique combination of down-scaling, cropping, up-scaling, and padding functions. FIG. 6A illustrates an input image 600 from which a downscaled image 610 is generated. As further illustrated in FIG. 6A, a cropped image/region of interest (RoI) 620 is selected from the downscaled image 610.

As shown in FIG. 6B, an output image 650 to an ML model is shown along with the RoI 620 selected from the input image 600 of FIG. 6A. The output image 650 further includes top padding, bottom padding, left padding, and right padding surrounding the RoI 620. Image data scaling (e.g., normalize, standardize, and quantize) in IEEE-FP32 precision using novel format conversion modules is supported. This enables efficient execution of pre-trained ML models in various floating- and fixed-point precisions (e.g., single-precision floating-point format (IEEE-FP32), brain floating point (Bfloat16), 16-bit floating point (FP16), and 8-bit floating point (FP8)). The disclosed inline data packing (in D4 format) enables efficient execution of the ML-accelerators. Additionally, this integrated hardware solution enables a wide range of ML use-cases. For example, these ML use-cases include advanced driver assistance systems (ADAS) that provide pedestrian and/or license plate detection and classification.

As described, aspects of the present disclosure are directed to bi-directional image scaling for hardware accelerators. In various aspects, an image may be scaled and stored using a single load bi-directional store technique.

A digital image may be received by a processor for scaling. The image data for pixels of the digital image may loaded in a horizontal direction. A horizontal scaling may be performed by applying a horizontal scaling factor M to the pixels. The scaled horizontal pixels may be stored. The horizontal scaling may be repeated for a number of subsequent rows according to the scaling factor for the vertical direction. For instance, where the vertical scaling factor N is two, the horizontal scaling may be performed for two rows of horizontal pixels. The horizontal scaled pixels may be accumulated for the N rows.

After the N rows have been scaled, vertical scaling may be performed by applying the vertical scaling factor to the columns of the accumulated pixels. Then, the vertical scaled pixels may be stored.

Figure 7:
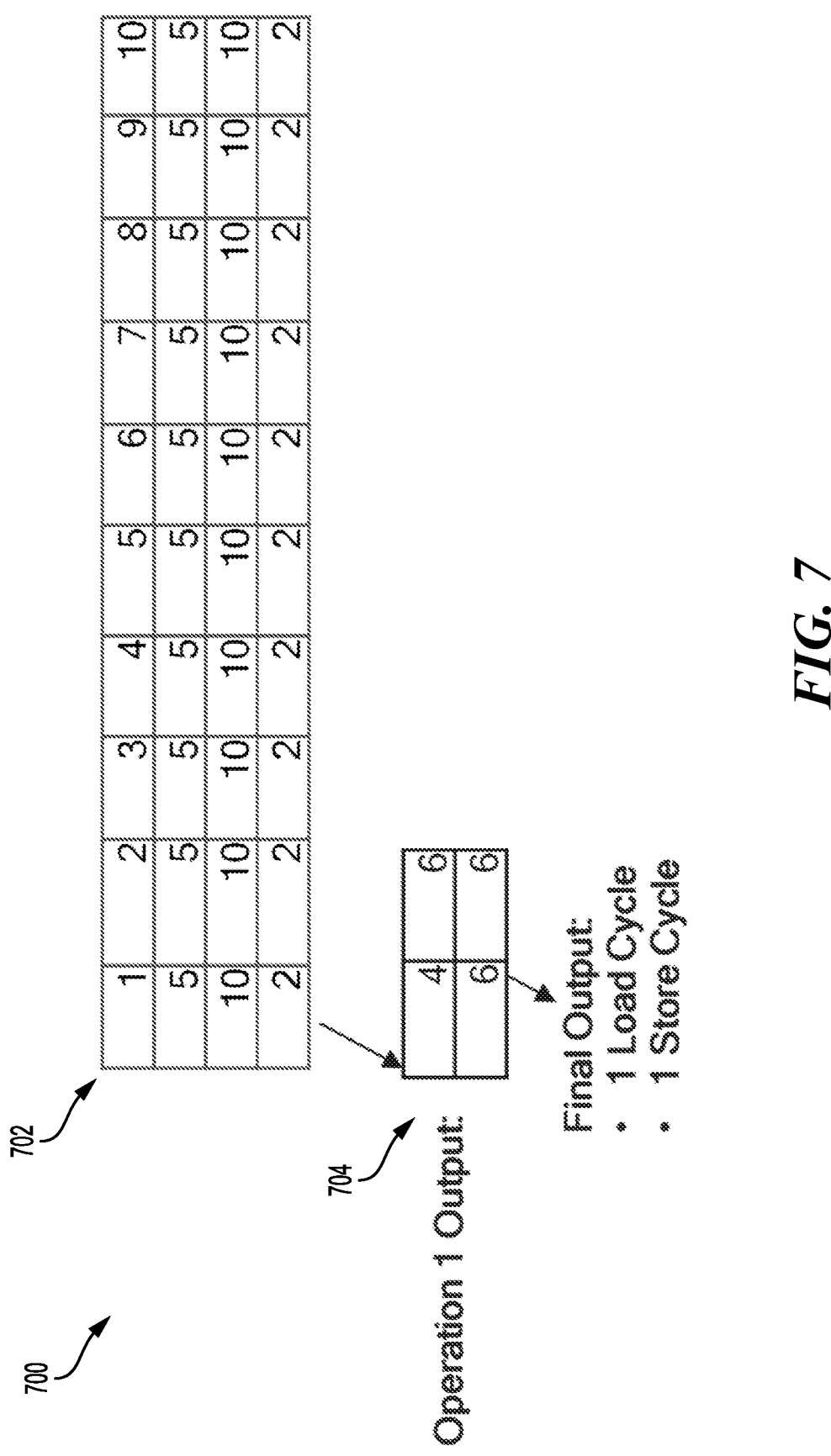
FIG. 7 is a diagram illustrating an example of bi-directional image scaling, in accordance with various aspects of the present disclosure.

FIG. 7 is a diagram illustrating an example of bi-directional image scaling 700, in accordance with various aspects of the present disclosure. Referring to FIG. 7, a set of pixels 702 corresponding to a digital image (or a portion of a digital image) may be received. The set of pixels 702 has a width of 10 and a height of 4. However, it should be understood, that the pixel dimensions are merely an example, for ease of explanation and not limiting. Any number of pixels may be included in the image (width and height).

In the example of FIG. 7, a bi-directional (M-N) scaling may be conducted in which the width of the digital image (or portion thereof) may be scaled by horizontal scaling value M=5 and the height may be scaled according to vertical scaling value N=2. A downscaled image output with a size of width two and height two may be generated.

A set of pixels 702 may be sampled in the horizontal direction according to the value of the horizontal scaling parameter (M=5). Accordingly, the first five pixels in the first row may be sampled. The scaled pixel values may be added to an accumulator. Subsequent sets of pixels (e.g., 702) may be sampled, scaled, and accumulated in the same manner until a number of rows equal to the vertical scaling value (N=2) is reached. Then, the accumulated horizontally scaled pixels may be vertically scaled by applying the vertical scaling value. In this example, the accumulated horizontally scaled pixel value may be divided by two and stored. Then, the accumulated value may be reset to zero.

The example bi-directional image scaling 700 may be repeated with the horizontal sampling, scaling, and accumulating being repeated until all rows of the set of pixels 702 have been processed, to generate the downscaled output 704. In doing so, the vertical scaling may be achieved as a by-product of the iterative accumulation and scaling in the horizontal direction. In this example, a reduction of two load cycles and two store cycles may be realized in comparison to conventional vectorized approaches.

FIG. 8 is a diagram illustrating example pseudocode 800 for bi-directional image scaling, in accordance with various aspects of the present disclosure. Referring to FIG. 8, for each value of x to the image width, a set of pixels equivalent to the horizontal scaling parameter (e.g., M=5) may be sampled in the horizontal direction (line 3). In some aspects, the size of the set of pixels sampled may be determined according to a hardware-accelerator (e.g., an ML-accelerator) utilized. For instance, in some aspects, 8 bytes or 128 bytes may be sampled.

At line 4, an interpolation (e.g., upscaling) or decimation (e.g., down-sampling) operation may be performed to compute a horizontally scaled value (M_SCALED). At line 5, the horizontally scaled value may be accumulated as N_ACCUMULATOR. A counter (N_ACCUMULATED_VALUES) may be initiated. A check may be performed to determine if the counter is equal to the vertical scaling parameter (N=2). If the counter condition has not been satisfied, the process may return to line 3, and the horizontal sampling, scaling, and accumulating may be repeated.

On the other hand, if the counter condition has been satisfied (e.g., N=2), at line 8, the accumulated horizontally scaled values (e.g., N_ACCUMULATOR) may be divided by the vertical scaling parameter N and may be stored (line 9). At line 10, the counter (N_ACCUMULATED VALUES) may be reset to zero. At line 11, the accumulated horizontally scaled values (e.g., N_ACCUMULATOR) may be stored.

Then, the process may be repeated for the next value of y until the image height is reached.

FIG. 9 is a flow diagram illustrating a method 900 for bi-directional image scaling, according to various aspects of the present disclosure The method may be performed using a processor such as CPU 102, GPU 104, NPU 130, for instance. In some aspects, the method may be performed using a hardware accelerator such as MLA 132 for example.

Referring to FIG. 9, at block 902, the processor receives a digital image including at least a portion to be scaled. For instance, as described with reference to FIG. 7, a set of pixels 702 corresponding to a digital image (or a portion of a digital image) may be received.

At block 904, the processor samples a set of pixels of the portion to be scaled in a horizontal direction. As described for example, with reference to FIG. 8, for each value of x to the image width, a set of pixels equivalent to the horizontal scaling parameter (e.g., M=5) may be sampled in the horizontal direction (line 3). In some aspects, the size of the set of pixels sampled may be determined according to a hardware-accelerator (e.g., an ML-accelerator). For instance, in some aspects, 8-bytes may be sampled or 128-bytes may be sampled.

At block 906, the processor bi-directionally scales the sampled set of pixels. The bi-directional scaling may include applying a horizontal scaling parameter to the sampled set of pixels to compute a horizontally scaled value (block 908). For instance, as described with reference to FIG. 8, at line 4, an interpolation (e.g., upscaling) or decimation (e.g., down-sampling) operation may be performed to compute a horizontally scaled value (M_SCALED).

The bi-directional scaling may also include accumulating the horizontally scaled value until a counter is equal to a vertical scaling parameter (block 910). For example, as described with reference to FIG. 8, at line 5, the horizontally scaled value may be accumulated as N_ACCUMULATOR.

The bi-directional scaling may further include computing a bi-directionally scaled value by applying the vertical scaling parameter to the accumulated horizontally scaled value (block 912). As described, for instance, with respect to FIG. 8, a counter (N_ACCUMULATED_VALUES) may be initiated. A check may be performed to determine if the counter is equal to the vertical scaling parameter (N=2). If the counter condition has not been satisfied, the process may return to line 3, and the horizontal sampling, scaling, and accumulating may be repeated. On the other hand, if the counter condition has been satisfied (e.g., N=2), at line 8, the accumulated horizontally scaled values (e.g., N_ACCUMU-LATOR) may be divided by the vertical scaling parameter N.

At block 914, the bi-directional scaling may also include storing the bi-directionally scaled value. For instance, the bi-directionally scaled value may be stored in memory 118 of SoC 100.

In some aspects, the method 900 may be performed by the SoC 100 (FIG. 1). That is, each of the elements of method 900 may, for example, but without limitation, be performed by the SoC 100 or one or more processors (e.g., GPU 104, DSP 106 and/or NPU 130) and/or other components included therein.

Implementation examples are included in the following number clauses.

1. A processor-implemented method, performed by one or more processors, the processor-implemented method comprising:
   receiving a digital image including at least a portion to be scaled;
   sampling a set of pixels of the portion to be scaled in a horizontal direction; and bi-directionally scaling the sampled set of pixels by:
      applying a horizontal scaling parameter to the sampled set of pixels to compute a horizontally scaled value;
      accumulating the horizontally scaled value until a counter is equal to a vertical scaling parameter;
      computing a bi-directionally scaled value by applying the vertical scaling parameter to the accumulated horizontally scaled value; and
      storing the bi-directionally scaled value.

2. The processor-implemented method of clause 1, further comprising repeating the sampling, scaling, and accumulating for each row of the portion to be scaled.

3. The processor-implemented method of clause 1 or 2, further comprising resetting the counter responsive to the counter being equal to the vertical scaling parameter.

4. The processor-implemented method of any of clauses 1-3, in which the digital image is vectorized.

5. The processor-implemented method of any of clauses 1-4, in which the one or more processors comprise a hardware accelerator.

6. The processor-implemented method of any of clauses 1-5, in which the digital image is loaded into memory using a single load operation.

7. The processor-implemented method of any of clauses 1-6, in which the bi-directionally scaling comprises an asymmetric scaling.

8. An apparatus for processor-implemented method, comprising:
   at least one memory; and
   at least one processor coupled to the at least one memory, the at least one processor configured to:
      receive a digital image including at least a portion to be scaled;
      sample a set of pixels of the portion to be scaled in a horizontal direction; and
      bi-directionally scale the sampled set of pixels by:
         applying a horizontal scaling parameter to the sampled set of pixels to compute a horizontally scaled value;
         accumulating the horizontally scaled value until a counter is equal to a vertical scaling parameter;
         computing a bi-directionally scaled value by applying the vertical scaling parameter to the accumulated horizontally scaled value; and
         storing the bi-directionally scaled value.

9. The apparatus of clause 8, in which the at least one processor is further configured to repeat the sampling, scaling, and accumulating for each row of the portion to be scaled.

10. The apparatus of clause 8 or 9, in which the at least one processor is further configured to reset the counter responsive to the counter being equal to the vertical scaling parameter.

11. The apparatus of any of clauses 8-10, in which the digital image is vectorized.

12. The apparatus of any of clauses 8-11, in which the one or more processors comprise a hardware accelerator.

13. The apparatus of any of clauses 8-12, in which the at least one processor is further configured to load the digital image into memory using a single load operation.

14. The apparatus of any of clauses 8-13, in which the bi-directionally scaling comprises an asymmetric scaling.

15. A non-transitory computer-readable medium having program code recorded thereon, the program code executed by one or more processors and comprising:

program code to receive a digital image including at least a portion to be scaled;

program code to sample a set of pixels of the portion to be scaled in a horizontal direction; and program code to bi-directionally scale the sampled set of pixels by:

applying a horizontal scaling parameter to the sampled set of pixels to compute a horizontally scaled value;

accumulating the horizontally scaled value until a counter is equal to a vertical scaling parameter;

computing a bi-directionally scaled value by applying the vertical scaling parameter to the accumulated horizontally scaled value; and storing the bi-directionally scaled value.

16. The non-transitory computer-readable medium of clause 15, in which the program code comprises program code to repeat the sampling, scaling, and accumulating for each row of the portion to be scaled.

17. The non-transitory computer-readable medium of clause 15 or 16, in which the program code comprises program code to reset the counter responsive to the counter being equal to the vertical scaling parameter.

18. The non-transitory computer-readable medium of any of clauses 15-17, in which the digital image is vectorized.

19. The non-transitory computer-readable medium of any of clauses 15-18, in which the one or more processors comprise a hardware accelerator.

20. The non-transitory computer-readable medium of any of clauses 15-19, in which the program code comprises program code to load the digital image into memory using a single load operation.

21. The non-transitory computer-readable medium of any of clauses 15-20, in which the program code to bi-directionally scale the sampled set of pixels performs an asymmetric scaling.

22. An apparatus for processor-implemented method, comprising:

means for receiving a digital image including at least a portion to be scaled;

means for sampling a set of pixels of the portion to be scaled in a horizontal direction; and means for bi-directionally scaling the sampled set of pixels by:

applying a horizontal scaling parameter to the sampled set of pixels to compute a horizontally scaled value;

accumulating the horizontally scaled value until a counter is equal to a vertical scaling parameter;

computing a bi-directionally scaled value by applying the vertical scaling parameter to the accumulated horizontally scaled value; and storing the bi-directionally scaled value.

23. The apparatus for processor-implemented method of clause 22, further comprising means for repeating the sampling, scaling, and accumulating for each row of the portion to be scaled.

24. The apparatus for processor-implemented method of clause 22 or 23, further comprising means for resetting the counter responsive to the counter being equal to the vertical scaling parameter.

25. The apparatus for processor-implemented method of any of clauses 22-24, wherein the digital image is vectorized.

26. The apparatus for processor-implemented method of any of clauses 22-25, further comprising means for loading the digital image into memory using a single load operation.

The system for accelerating machine learning includes means for storing the image in the blocked ML storage acceleration format according to the assigned address. In one aspect, the storing means may be the storage acceleration format block 500 configured to perform the functions recited. In another configuration, the means may be any module, or any apparatus configured to perform the functions recited by the means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or general register files. Although the various components discussed may be described as having a specific location, such as a local component, they may also be configured in several ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium.

Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/ or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method, performed by one or more processors, the processor-implemented method comprising:

receiving a digital image including at least a portion to be scaled;

sampling a set of pixels of the portion to be scaled in a horizontal direction; and bi-directionally scaling at least the portion of the digital image in the horizontal direction and a vertical direction according to the sampled set of pixels by:

applying a horizontal scaling parameter to the sampled set of pixels to compute a horizontally scaled value;

accumulating the horizontally scaled value until a counter is equal to a vertical scaling parameter;

computing a bi-directionally scaled value by applying the vertical scaling parameter to the accumulated horizontally scaled value; and storing the bi-directionally scaled value.

2. The processor-implemented method of claim 1, further comprising repeating the sampling, scaling, and accumulating for each row of the portion to be scaled.

3. The processor-implemented method of claim 1, further comprising resetting the counter responsive to the counter being equal to the vertical scaling parameter.

4. The processor-implemented method of claim 1, in which the digital image is vectorized.

5. The processor-implemented method of claim 1, in which the one or more processors comprise a hardware accelerator.

6. The processor-implemented method of claim 1, in which the digital image is loaded into memory using a single load operation.

7. The processor-implemented method of claim 1, in which the bi-directionally scaling comprises an asymmetric scaling.

8. An apparatus for processor-implemented method, comprising:

at least one memory; and at least one processor coupled to the at least one memory, the at least one processor configured to:

receive a digital image including at least a portion to be scaled;

sample a set of pixels of the portion to be scaled in a horizontal direction; and bi-directionally scale at least the portion of the digital image in the horizontal direction and a vertical direction according to the sampled set of pixels by:

applying a horizontal scaling parameter to the sampled set of pixels to compute a horizontally scaled value;

accumulating the horizontally scaled value until a counter is equal to a vertical scaling parameter;

computing a bi-directionally scaled value by applying the vertical scaling parameter to the accumulated horizontally scaled value; and storing the bi-directionally scaled value.

9. The apparatus of claim 8, in which the at least one processor is further configured to repeat the sampling, scaling, and accumulating for each row of the portion to be scaled.

10. The apparatus of claim 8, in which the at least one processor is further configured to reset the counter responsive to the counter being equal to the vertical scaling parameter.

11. The apparatus of claim 8, in which the digital image is vectorized.

12. The apparatus of claim 8, in which the one or more processors comprise a hardware accelerator.

13. The apparatus of claim 8, in which the at least one processor is further configured to load the digital image into memory using a single load operation.

14. The apparatus of claim 8, in which the bi-directionally scaling comprises an asymmetric scaling.

15. A non-transitory computer-readable medium having program code recorded thereon, the program code executed by one or more processors and comprising:

program code to receive a digital image including at least a portion to be scaled;

program code to sample a set of pixels of the portion to be scaled in a horizontal direction; and program code to bi-directionally scale at least the portion of the digital image in the horizontal direction and a vertical direction according to the sampled set of pixels by:

applying a horizontal scaling parameter to the sampled set of pixels to compute a horizontally scaled value;

accumulating the horizontally scaled value until a counter is equal to a vertical scaling parameter;

computing a bi-directionally scaled value by applying the vertical scaling parameter to the accumulated horizontally scaled value; and storing the bi-directionally scaled value.

16. The non-transitory computer-readable medium of claim 15, in which the program code comprises program code to repeat the sampling, scaling, and accumulating for each row of the portion to be scaled.

17. The non-transitory computer-readable medium of claim 15, in which the program code comprises program code to reset the counter responsive to the counter being equal to the vertical scaling parameter.

18. The non-transitory computer-readable medium of claim 15, in which the digital image is vectorized.

19. The non-transitory computer-readable medium of claim 15, in which the one or more processors comprise a hardware accelerator.

20. The non-transitory computer-readable medium of claim 15, in which the program code comprises program code to load the digital image into memory using a single load operation.

21. The non-transitory computer-readable medium of claim 15, in which the program code to bi-directionally scale the sampled set of pixels performs an asymmetric scaling.

22. An apparatus, comprising:
  means for receiving a digital image including at least a portion to be scaled;
  means for sampling a set of pixels of the portion to be scaled in a horizontal direction; and means for bi-directionally scaling at least the portion of the digital image in the horizontal direction and a vertical direction according to the sampled set of pixels by:
    applying a horizontal scaling parameter to the sampled set of pixels to compute a horizontally scaled value;
    accumulating the horizontally scaled value until a counter is equal to a vertical scaling parameter;
    computing a bi-directionally scaled value by applying the vertical scaling parameter to the accumulated horizontally scaled value; and
    storing the bi-directionally scaled value.

23. The apparatus of claim 22, further comprising means for repeating the sampling, scaling, and accumulating for each row of the portion to be scaled.

24. The apparatus of claim 22, further comprising means for resetting the counter responsive to the counter being equal to the vertical scaling parameter.

25. The apparatus of claim 22, wherein the digital image is vectorized.

26. The apparatus of claim 22, further comprising means for loading the digital image into memory using a single load operation.

* * * * *